INVENTORS
Bingham J. Humphrey
Pieter J.C. Kuiper
Israel Zelitch

Delio and Montgomery
ATTORNEYS

United States Patent Office 3,399,990
Patented Sept. 3, 1968

3,399,990
METHOD OF CLOSING PLANT STOMATA WITH ALKENYL SUCCINIC ACIDS
Bingham J. Humphrey, 680 Evergreen Ave., and Israel Zelitch, 82 Morse St., both of Hamden, Conn. 06514, and Pieter J. C. Kuiper, 853 Townsend Ave., East Haven, Conn. 06512
Filed Nov. 30, 1964, Ser. No. 416,675
(Filed under Rule 47(a) and 35 U.S.C. 116)
3 Claims. (Cl. 71—113)

ABSTRACT OF THE DISCLOSURE

Method for treating plants to reduce plant transpiration, increase root permeability, provide frost and drought resistance, which comprises coating a plant with an effective amount of alkenyl succinic acid.

---

Figure 1:
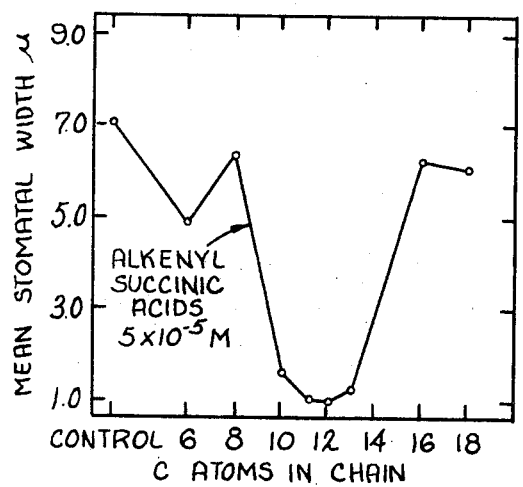

The present invention relates to succinic acid derivatives and, more particularly, relates to the use of succinic acid hydrocarbon chain, branched chain and cyclic derivatives having at least one degree of unsaturation to beneficially affect plant life.

Water shortages, drought, cold and frost have always been the enemies of plant life. To combat this, farmers and others have resorted to irrigation in an attempt to prevent damage to crops due to water shortages, and to smudge pots to prevent damage due to frost. Water shortage is particularly critical in desert areas where water is not readily available or is not easily provided by way of irrigation. Further, in the northern climates, early and unpredictable cold weather generally reduces the length of time for the normal growing season and causes crop damage due to frost.

In an effort to solve these problems and others, some means were desired to reduce the detrimental effects of both drought and frost. Accordingly, this invention represents an improved solution to the problems of reducing such detrimental effects.

It has been discovered that the treating and coating of plant life with succinic acid derivatives having at least one degree of unsaturation will effectively reduce the transpiration rate of the plant life by closing plant stomata, thereby decreasing the water requirement of the plant. Stomata are generally denfied as minute openings in the epidermis of leaf stems and plant organs through which gaseous interchange between the atmosphere and the intercellular spaces within the leaf occur and the opening together with its associated guard cells and accessory cells. Transpiration is generally defined as the emission or exhalation of water vapor from the surfaces of leaves or other parts of plants. The coating of the exposed above-ground portion of the plant with the succinic acid derivatives having at least one degree of unsaturation, has effectively provided a means for combating the effects of cold and frost on plant life. Additionally, by exposing and coating plant roots and underground membranes to and with the succinic acid derivatives having at least one degree of unsaturation, it is possible to increase the water permeability of the roots, thereby permitting increased water intake, and thus allowing the plant to take in increased water from the surrounding soil even though the soil is relatively dry. Further, the exposure of the underground parts of plants, such as the roots and cellular membranes to succinic acid derivatives having at least one degree of unsaturation has produced effective methods of preventing the detrimental effects of frost and cold.

In this manner, these compounds promise to become effective agents to prevent loss of crops by drought, cold and frost and, further, permit crops to be grown in arid areas which heretofore have been unsuccessfully grown in such areas.

Accordingly, it is an object of this invention to provide a new and improved method of beneficially affecting plant life.

A further object of this invention is to provide a method of closing plant stomata.

Another object of this invention is to provide a new and improved method of decreasing plant transpiration.

Another object of this invention is to provide a method for increasing the water permeability of plant life.

A still further object of this invention is to provide means for reducing loss of plant life due to frost, drought and cold.

Other objects of this invention will in part be obvious and will in part appear hereinafter.

The invention accordingly comprises the step or steps which will be exemplified in the method hereinafter disclosed, and the scope of the invention will be indicated in the claims.

Figure 2:
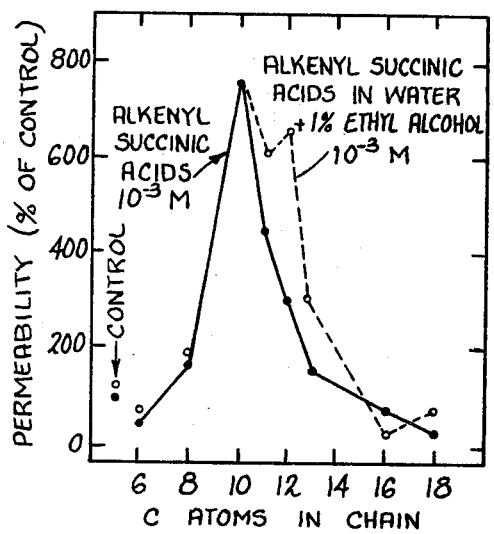

For a fuller understanding of the nature and objects of the invention, reference should be had to the following detailed description taken in conjunction with the accompanying drawings, in which:

FIG. 1 is a graph showing the effect of alkenyl succinic acids on the stomata of plants; and FIG. 2 is a graph showing the effect of alkenyl succinic acid on the permeability of plant root cells.

In accordance with the teachings of this invention, it has been determined that derivatives of succinic acid corresponding to the following structural formula:

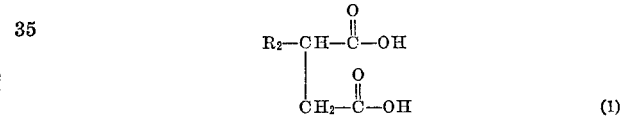

(1)

wherein $R_2$ represents a carbon group having at least one degree of unsaturation which may be selected from a class consisting of alkenyl, alkynyl, and members of the cycloalkenyl or aralkenyl group having at least one double bond, triple bond, or a combination of double and triple bonds, together with alkenyl or alkynyl branched chains, may be beneficially utilized in treating plant life.

The results obtained were quite surprising inasmuch as saturated compounds opened stomata and increased transpiration instead of closing stomata and reducing transpiration.

The following examples illustrate preferred embodiments of the disclosed invention to show the beneficial use of the compounds.

Example I

Alkenyl succinic acids, having the structural formula as follows:

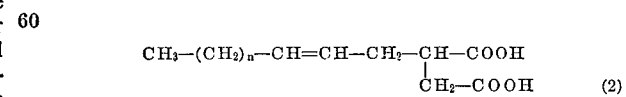

(2)

were utilized on plant life and were discovered to be effective in reducing the dimension of stomata, thereby effectively reducing plant transpiration. These alkenyl succinic acids are commercially available from Humphrey-Wilkinson, Inc., of North Haven, Conn. Additionally, the methods for preparing such alkenyl succinic acids of Equation 2 have been disclosed in the prior art.

In FIG. 1 of the drawings there is shown a graph of the effect of both of the hydrocarbon chains of an alkenyl succinic acid, of the type shown in Equation 2, on the mean stomata width of a standard leaf tobacco disk assay. This graph shows that alkenyl chains of between 8 and 16 ($N=4-12$) carbon atoms produce the best result. It should be understood of course, that there was reactivity for values of N greater than 16 and less than 4, which significantly reduced plant transpiration. To obtain the results shown in the graph of FIG. 1, alkenyl succinic acids were sprayed on tobacco leaves in a concentration of $5 \times 10^{-5}$ molar preferably using a solution of distilled water. A wetting agent, such as triton could be used to provide better adhesion. Further, alcohol such as ethyl alcohol, could be utilized to improve the solubility of the alkenyl succinic acid in the water. Further experimentation has shown that concentrations between $10^{-6}$ to $10^{-1}$ molar of alkenyl succinic derivatives, preferably alkenyl succinic derivatives of the type shown in Equation 2, have proved to be effective in reducing the transpiration rate of plants as well as being nontoxic to plant life, although a range of $10^{-5}$ to $10^{-3}$ molar is preferred.

Example II

Alkenyl succinic acids of the above Formula 2 have been applied successfully to plant root cell membranes to increase the water permeability of the root cell membranes. In FIG. 2 there is shown a graph illustrating the effect of alkenyl succinic acids of different hydrocarbon chain lengths on the permeability of bean roots to water. To obtain the graph shown in FIG. 2, bean roots were exposed to a solution of alkenyl succinic acid of hydrocarbon chain lengths of from 6–18 carbon atoms ($N=2-14$). The alkenyl succinic acid was utilized at a concentration of $10^{-3}$ M molar in water. The results of the use of the water $10^{-3}$ solution of the alkenyl succinic acid is shown by the solid dots in FIG. 2. The open circled graph in FIG. 2 represents the use of alkenyl succinic acids in a solution of water with the addition of 1% ethyl alcohol. The concentration of the alkenyl succinic acid remained at $10^{-3}$ molar. The graphs of FIG. 2 disclose that the permeability of bean roots treated with the alkenyl succinic solution increased significantly, e.g., alkenyl succinic acid having 10 carbons in the chain provided an increase of almost 800% in the bean root permeability versus that of a control bean root not being treated with the solution. It would thus appear that by utilizing solutions of the type mentioned above, plants could be grown in areas having less water per foot than would ordinarily be required to grow the same plants.

Example III

The alkenyl succinic acids of the type disclosed in Equation 2 were sprayed on apple blossoms. The use of alkenyl succinic acids of the type having at least one degree of unsaturation have proved to be effective to prevent the significant loss of plant life due to frost. In particular, several branches of apple trees, Baldwin, Golden and Delicious, and Bosc pear trees in an orchard were sprayed with $10^{-3}$ decenyl succinic acid and kept wet for two hours in polyethylene bags. The twigs within their bags were then placed in an insulated styrofoam box. The branch was surrounded by a mixture of ice and salt at $-6°$ C. After two hours the branches were removed from the box and the bags. Most of the flowers survived, whereas untreated flowers and leaves exposed to the same temperature were completely dead.

Example IV

Alkenyl succinic acids of the type shown in Equation 2 have also been discovered to be effective combatants against drought.

TABLE 1

| Potential (atm.) | Conc. of decenylsuccinic acid (M) | | | |
|---|---|---|---|---|
| | 0 | $10^{-5}$ | $10^{-4}$ | $10^{-3}$ |
| | Leaf growth | | | |
| 0 | 51 | 44 | 41 | 40 |
| 0.6 | 21 | 25 | 28 | 26 |
| 1.3 | 13 | 15 | 21 | 20 |
| 2.9 | 0 | 4 | 4 | 8 |
| | Survival (percent) | | | |
| 2.9 | 35 | 90 | 100 | 100 |

The foregoing Table 1 shows the expansion of the first pair of leaves of bean plants (cm.$^2$) and survival as affected by decenylsuccinic acid when the roots are subjected to varying water potentials. Potentials were created by 0.5, 10 and 15 percent polyethylene glycol. Initial leaf area was 14.8 cm.$^2$, and results are presented as mean increase in leaf area for 20 replicates (standard error 1.55 cm.$^2$). In this table it is apparent that the use of alkenyl succinic acids permits plant life to be grown in drought areas with increased survival rates, thereby providing a means for preventing the loss of crops by drought.

Further in accordance with the teachings of this invention, it has been determined that derivatives of succinic acid corresponding to the following structural formula:

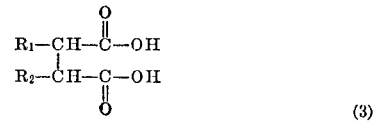

$$R_1-CH-C-OH$$
$$R_2-CH-C-OH$$

(3)

wherein $R_1$ and $R_2$ are selected from a class consisting of hydrogen, alkenyl, alkynyl, aralkenyl, as long as $R_1$ or $R_2$ have at least one degree of unsaturation. Derivatives of succinic acid disclosed in Equation 3 show promise for decreasing plant transpiration, increasing root water permeability, increasing frost resistance, as well as providing a means for growing crops which is resistant to drought.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. A method of treating plants to close plant stomata thereby decreasing the water requirements of the plant comprising coating a portion of the plant with an effective amount of a compound of the formula:

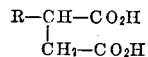

$$R-CH-CO_2H$$
$$CH_1-CO_2H$$

wherein R is a straight chain alkenyl having from 5 to 18 carbon atoms.

2. A method of treating plants to close plant stomata thereby decreasing the water requirements of the plant comprising coating a portion of the plant with an effective amount of a compound of the formula:

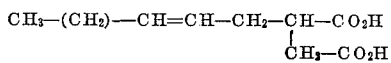

wherein $n$ is an integer from 1 to 14.

3. The method of claim 2 wherein $n=8$.

References Cited

UNITED STATES PATENTS

| 2,283,214 | 5/1942 | Kyrides | 252—89 |
| 2,360,426 | 10/1942 | Kyrides | 260—537 |
| 2,770,077 | 11/1956 | Smith | 47—58 |
| 3,205,059 | 9/1956 | Roberts | 71—2.7 |

OTHER REFERENCES

Kuiper, Science 143, 690–691 (1964).
Kuiper, Science 146, 544–546 (1964).
Waggoner et al., Nature 201, 97–98 (1964).
Zelitch, Science 143, 692–693 (1964). (Copies in P.O.S.L.)

LEWIS GOTTS, *Primary Examiner.*
M. M. KASSENOFF, *Assistant Examiner.*

UNITED STATES PATENT OFFICE
CERTIFICATE OF CORRECTION

Patent No. 3,399,990                          September 3, 1968

Bingham J. Humphrey et al.

It is certified that error appears in the above identified patent and that said Letters Patent are hereby corrected as shown below:

Column 5, lines 3 and 4, the formula should appear as shown below:

Signed and sealed this 10th day of February 1970.

(SEAL)
Attest:

Edward M. Fletcher, Jr.                              WILLIAM E. SCHUYLER, JR.
Attesting Officer                                         Commissioner of Patents